United States Patent
Short et al.

(10) Patent No.: US 8,886,837 B2
(45) Date of Patent: Nov. 11, 2014

(54) FLOW-BASED COMPRESSION MANAGEMENT

(75) Inventors: Todd Short, Sudbury, MA (US); David McGrew, Poolesville, MD (US)

(73) Assignee: Cisco Technology, Inc., San Jose, CA (US)

(*) Notice: Subject to any disclaimer, the term of this patent is extended or adjusted under 35 U.S.C. 154(b) by 227 days.

(21) Appl. No.: 13/309,669

(22) Filed: Dec. 2, 2011

(65) Prior Publication Data
US 2013/0145047 A1     Jun. 6, 2013

(51) Int. Cl.
*G06F 15/16* (2006.01)

(52) U.S. Cl.
USPC ........... 709/247; 709/224; 709/230; 709/232; 709/228; 709/229; 709/231; 709/234

(58) Field of Classification Search
USPC ......... 709/247, 224, 230, 232, 228, 229, 231, 709/234
See application file for complete search history.

(56) References Cited

U.S. PATENT DOCUMENTS

| | | | |
|---|---|---|---|
| 5,987,183 A * | 11/1999 | Saunders et al. | 382/239 |
| 6,976,026 B1 * | 12/2005 | Getzinger et al. | 1/1 |
| 7,229,012 B1 * | 6/2007 | Enright et al. | 235/379 |
| 7,590,070 B1 | 9/2009 | Asawa et al. | |
| 7,668,965 B2 * | 2/2010 | Ayres et al. | 709/231 |
| 7,668,968 B1 * | 2/2010 | Smith | 709/234 |
| 7,966,399 B2 * | 6/2011 | Jones et al. | 709/224 |
| 2002/0103938 A1 | 8/2002 | Brooks et al. | |
| 2005/0008037 A1 | 1/2005 | Koren et al. | |
| 2005/0147310 A1 * | 7/2005 | Getzinger et al. | 382/239 |
| 2010/0030797 A1 | 2/2010 | Johnson et al. | |
| 2012/0159000 A1 * | 6/2012 | Diab | 709/247 |

OTHER PUBLICATIONS

International Search Report and Written Opinion in counterpart International Application No. PCT/US2012/051026, mailed Sep. 26, 2012.

* cited by examiner

*Primary Examiner* — Lan-Dai T Truong
(74) *Attorney, Agent, or Firm* — Edell, Shapiro & Finnan, LLC (57) ABSTRACT

Flow-based data compression is achieved by selecting which of a set flows are compressed, which packets within each flow are compressed, and the level of effort applied to compress each packet. Compression scheduling across multiple flows excludes certain packets in respective flows from compression by way of skip patterns in a table or that are generated by a geometrically progressive skip scheme. Compression scheduling may include adjusting the level of compression effort.

24 Claims, 7 Drawing Sheets

FLOW-BASED COMPRESSION MANAGEMENT

TECHNICAL FIELD

The present disclosure relates to data compression on network data flows.

BACKGROUND

In data networks, a flow is a sequence of packets from a source device to a destination, which may be a single device, a multicast group, or a broadcast domain. Data compression at network nodes balances the bandwidth used by traffic traversing the network against the cost in computational resources needed to compress the data at the node. Attempting to compress all data traversing the node is prohibitively costly. The analysis alone on individual packets to determine whether cost of compression is worth potential savings in network traffic utilizes precious computational resources that could otherwise be used for compression and other processes.

DESCRIPTION OF EXAMPLE EMBODIMENTS

Overview

A level of data compression on data flows in a network node is established by determining whether the data flows are compressible to a certain compression level. The level of compression for each of the flows is modified independently when it is determined that one or more of the data flows is incompressible. The data flows are then compressed in accordance with the level of compression.

Example Embodiments

Figure 1:
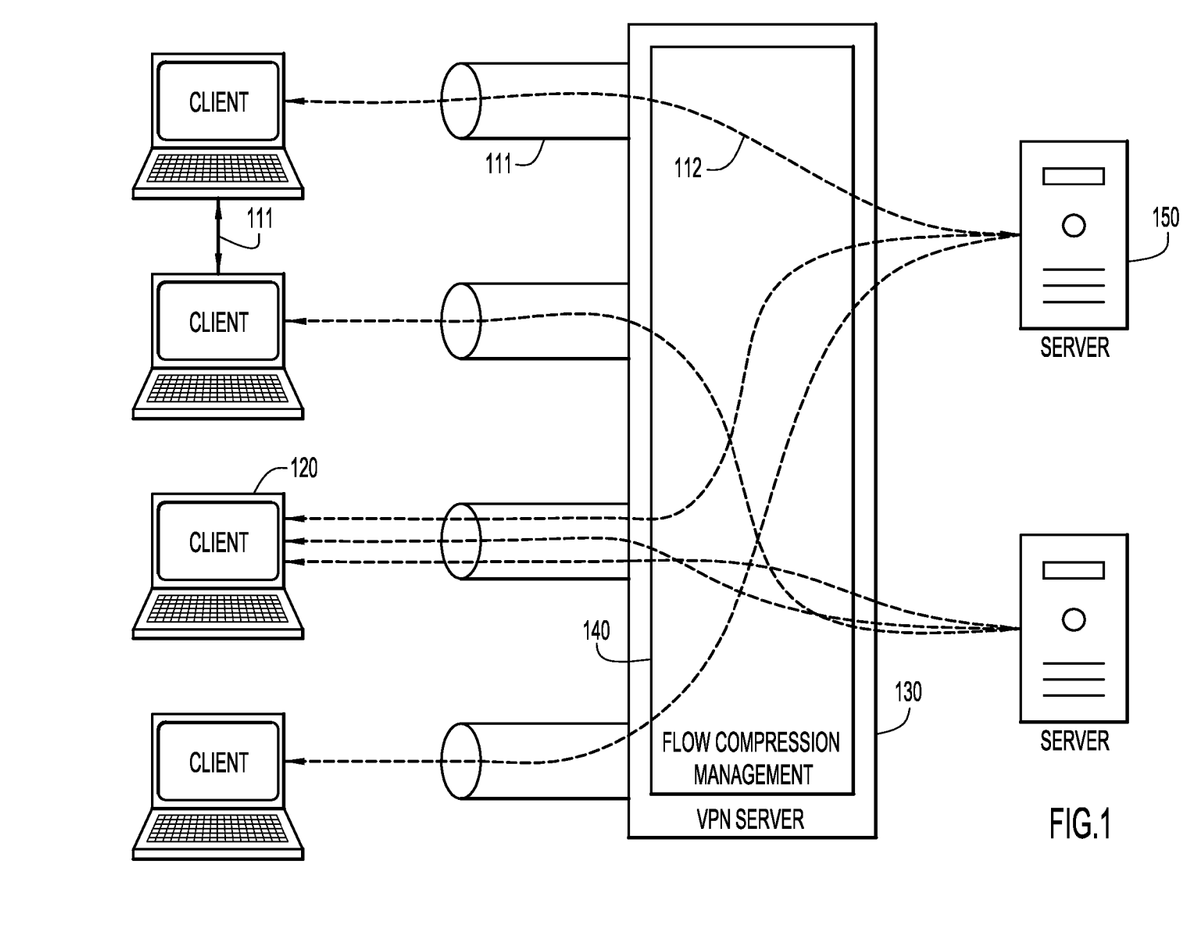
FIG. 1 is a diagram illustrating a flow compression management implementation in a virtual private network setting.

FIG. 1 depicts a virtual private network (VPN) configuration 100 having one or more client devices, representatively illustrated at client device 120, and one or more servers, representatively illustrated at server 150. Client devices 120 may be remote from some enterprise that operates servers 150 and may access such servers 150 only through suitably secured network traffic, such as by VPN tunneling, representatively illustrated at tunnel 111. The tunneled network traffic from client devices 120 to servers 150 may occur through one or more data flows 112 traversing VPN 100, where the term data flow, or simply flow, refers herein to a sequence of packets destined for a destination network device from a source network device. Whereas, such flows 112 are illustrated in FIG. 1 as traversing VPN 100 concurrently, such is an abstraction; packets from different flows are interspersed with packets of other flows, including flows comprising unsecured packets, in the overall network traffic. Flows 112 may be secured by client devices 120 by encrypting and encapsulating packets of a network protocol, such as the Internet Protocol (IP), where such encapsulation includes addressing the encrypted network packet to an intermediary, often an enterprise edge device, such as VPN server 130. At VPN server 130, the network packets are stripped of the encapsulating data, decrypted and routed to the destination node, such as server 150, per the address in the network packet header.

In certain virtual private network implementations, data in various flows 112 are compressed as well as encrypted. Such compression may be on individual packets, whereby each packet is indiscriminately compressed to a percentage of its original size. On the other hand, flow compression, as used herein, is a technique by which certain portions of traffic in a flow are selected for compression with the goal of reducing the amount of data traversing a network in the flow. Such compression may occur in VPN server 130 and managed by flow compression manager (FCM) 140, which may implement the functionality of flow compression, such as by selecting which portions of flow 112 to compress and selecting the compression effort to impart on flow 112. Additionally, FCM 140 may implement functionality by which the overall compression of flow 112 is determined by the resources available for such. For example, if a processor is executing processes that require high utilization of processing resources thereof, FCM 140 may reduce the compression on flow 112 and may subsequently increase the flow compression as resources become available.

As used herein, compression level refers to a quantity indicative of the aggressiveness at which compression is pursued and is expressed on a scale on which higher values mean more aggressiveness. Compression level expresses an amount for which compression is desired, which is not necessarily that ultimately achieved.

VPN 100 is illustrative of a typical scenario in network resource management, i.e., that a network node, such as VPN server 130, must share its processing resources across numerous processes, some of which, such as encryption and compression, executing alone are computationally intensive. The resource management techniques described herein are thus applicable to systems other than virtual private networks, as will be appreciated by the ordinarily skilled artisan upon review of this disclosure. For example, flow control management may be implemented on individual client devices 120 or on servers outside the VPN environment. Accordingly, client devices may communicate with other client devices over compressed connections, as representatively illustrated at connection 114.

Figure 2:
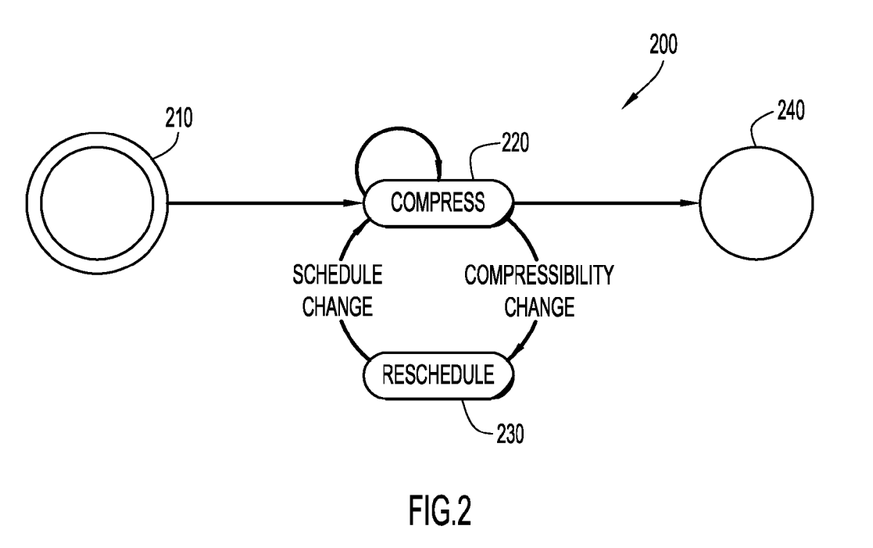
FIG. 2 is a state diagram illustrating a flow compression management state machine implementation.

FIG. 2 depicts a state diagram by which flow compression management may be achieved. FCM 140 may be viewed as a state machine 200 implemented in suitable hardware or in suitable processing instructions executing on a processor. From an initialization state 210, state machine 200 may transition into a compression state 220, by which one or more flows are compressed in accordance with a compression schedule. As used herein, a compression schedule is set of parameters that define a compression strategy by which flow compression is achieved. Such compression schedule may define the number of packets in a flow to compress, e.g., every packet, every other packet, etc., may define the type of data packets to compress or to exclude from compression, e.g., by excluding packets containing image data, and may define relative flow compression to minimize the impact of compression on the available resources for such, e.g., reduce flow compression when available computational resources are below 50% of total capacity. State machine 200 may remain in the compression state as long as the compression schedule in force is at or near optimal for a set of conditions, such as processor load and flow composition. When it is determined that the compression schedule in force is no longer optimal, such as, for example, when portions of the flow are incompressible or when additional computational resources for compression become available, state machine 200 transitions into a reschedule state 230, whereby a new compression schedule is established. The new compression schedule may reduce the flow compression, by excluding additional portions of a flow from compression, or may increase the flow compression, such as by reducing the size of the excluded portions. Once the rescheduling has occurred, state machine 200 may transition back to compression state 220, where compression on the flow resumes under the new compression schedule. Terminal state 240 may be entered upon deactivation of the flow control manager, such as by removal of power from the infrastructure by which it is implemented. It is to be understood that a state machine 200 may operate on a single flow and that a plurality of such state machines may operate substantially in parallel.

It is to be understood and appreciated that granularity of compression is finite in a flow and, as such, a compression schedule may establish conditions by which only a certain amount of compression can be achieved. Thus, optimal compression, as used herein, is that achieved by selection of the best compression schedule from a set of compression schedules. A compression schedule may be established through a machine-implementation of a mathematical formula, in which case there are no theoretical bounds on the set of compression schedules. However, practical bounds may enforce the number of compression schedules in the set for a given implementation and, as such, may enforce the optimal compression achievable for that implementation. For example, the domain over which the mathematical formula is evaluated may itself be finite, which would establish bounds on the number of possible compression schedules. Alternatively, a fixed set of compression schedules may be established and stored in a memory device, such as through a lookup table, in which case optimal compression is that achieved by selecting the best schedule from the set for given conditions.

Figure 3A:
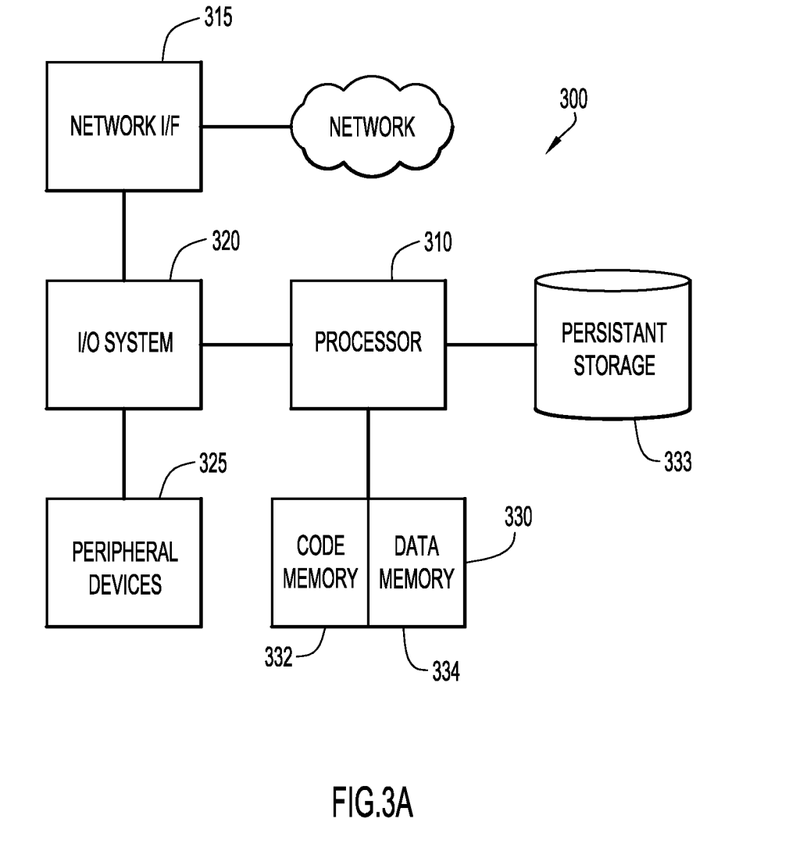
FIGS. 3A-3B are schematic block diagrams of an example of network node device incorporating flow compression management.

FIG. 3A illustrates a system configuration suitable to embody control and processing features of a network node including those implementing a flow control manager. A data processing apparatus 300 of FIG. 3A includes an input/output (I/O) system 320, through which the data processing apparatus 300 may communicate with other nodes through network interface controller 315 and with peripheral devices, collectively represented at block 325, such as display devices, Human Interface Devices (HIDs), printers, monitoring equipment, test equipment and/or other devices suitable to provide input to and output from the data processing apparatus 300.

Data processing apparatus 300 of the embodiment illustrated in FIG. 3A includes a processor 310 to, among other things, execute processing instructions that implement various functional modules, such as those described with reference to FIG. 3B. It is to be understood that processor 310 is not limited to a particular hardware configuration or instruction set architecture, which may be configured by numerous structures that perform equivalently to those illustrated and described herein. Moreover, it is to be understood that while the processor is illustrated as a single component, certain embodiments may include distributed processing implementations through multiple processing elements.

A storage unit 330 may be utilized to store data and processing instructions on behalf of data processing apparatus 300 of FIG. 3A. The storage unit 330 may include multiple segments, such as a code memory 332 to maintain processor instructions to be executed by the processor, and data memory 334 to store data, such as buffers and data structures on which the processor performs data manipulation operations. The storage unit 330 may include memory that is distributed across components, to include, among others, a cache memory and a pipeline memory.

The data processing apparatus 300 may include a persistent storage system 333 to store data and processing instructions across processing sessions. The persistent storage system may be implemented in a single persistent memory device, such as a hard disk drive, or may be implemented in multiple persistent memory devices, which may be interconnected by a communication network.

Figure 3B:
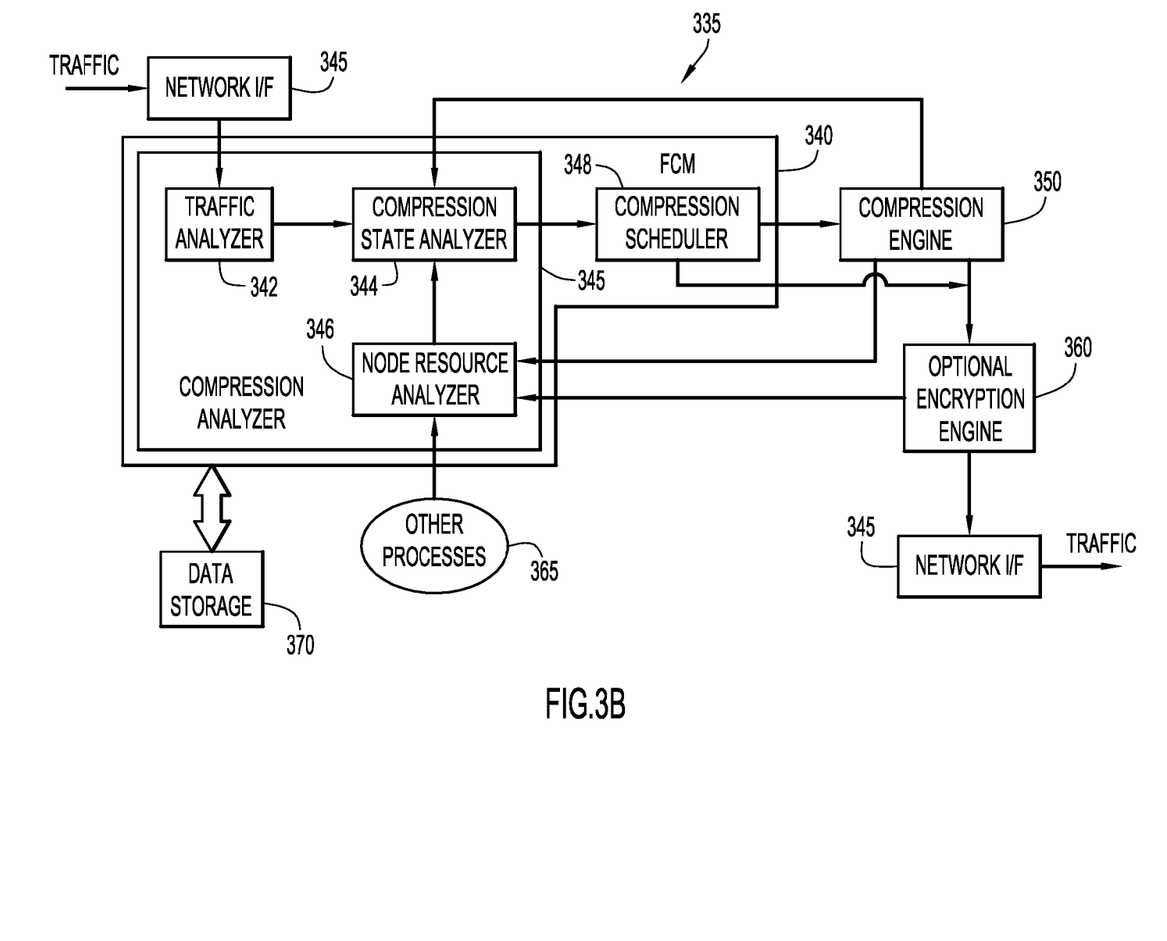

In FIG. 3B, a network node device 335, or simply network node 335, is illustrated, which may be any device through which network traffic passes, such as routers, gateways, firewalls, servers, etc. Network node 335 may be implemented on suitable data processing equipment, such as data processing apparatus 300. It is to be understood that network node 335 may perform services other than those not illustrated in FIG. 3B, such as packet routing. Such processes are representatively illustrated as other processes 365, but are not explicitly illustrated and described herein.

As is illustrated in FIG. 3B, network node 335 may include FCM 340 to manage flow compression therein, a data storage unit 370 for data buffering and variable data storage, a compression engine 350 to compress data flows in accordance with signals provided by FCM 340, and an encryption engine 360 which may be used to encrypt flow data, such as in the VPN implementation illustrated in FIG. 1. FCM 340, compression engine 350 and encryption engine 360 may be implemented through suitably programmed processing instructions, referred to herein as software, executing as respective processes on a processor, such as processor 310.

Network traffic in which data flows are defined are received and transmitted through a network interface 345, where the traffic entering network node 335 may be in one compression state, even an uncompressed state, and that exiting network node 335 may be in another compression state established by compression engine 350. FCM 340 includes a compression analyzer 345 to evaluate processing requirements of network node 335, referred to herein as node conditions and include such considerations as, among other things, the quantity and type of traffic passing through network node 335 and the computational resources available thereat. FCM 340 also includes a compression scheduler 348 to provide a corresponding compression schedule to compression engine 350. Compression analyzer 345 determines from the node conditions a compression level meeting the requirements and provides a signal indicative of such to compression scheduler 348. Compression scheduler 348 determines from the selected compression level which of a set of compression schedules to apply and provides a signal indicative of such to compression engine 350. Additionally, compression scheduler 348 may, upon suitable signaling from, for example, compression analyzer 345, compel complete bypass of compression engine 350, such as when one or more flows, regardless of the compressibility thereof, are not to be compressed.

Figure 4A:
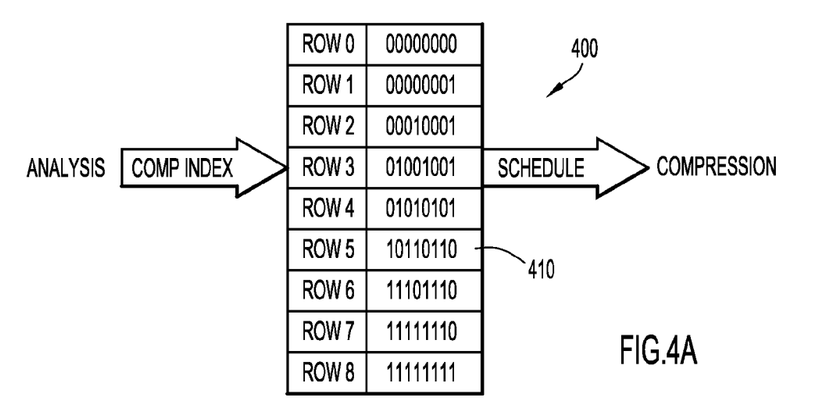
FIGS. 4A-4C are diagrams illustrating several compression scheduling strategies.

A compression schedule may define a scheme in which certain spans of data packets of a flow are skipped, which, as used herein, refers to a packet's exclusion from compression. That is, packets of a flow are compressed unless such compression schedule indicates that the packet is to be excluded from compression, i.e., skipped. For given node conditions, the number of skipped packets and the manner in which the packets are skipped may be established through a compression schedule selected for those conditions. For example, a compression schedule may be implemented through a skip table, which, as used herein, is a data structure stored in a storage device, such as a lookup table in data storage 370, indicating which packets in a flow are to be skipped for different node conditions. One implementation of such a skip table comprising a set of nine (9) compression schedules is illustrated in FIG. 4A. Each compression schedule 410 in skip table 400 takes the form YYYYYYYY, where Y is a binary digit taking a value one (1) if the corresponding packet is to be skipped. Compression analyzer 345 may analyze the node conditions and establish thereby a compression index, which may be fulfilled by an address into the skip table 400. Compression scheduler 348 may retrieve the compression schedule 410 indicated to by the compression index, and provide the bit pattern forming the corresponding compression schedule as, for example, a digital signal to compression engine 350. As the skip index increases, the number of packets to skip is increased. As the skip index decreases, the number of packets to skip also decreases.

Figure 4B:
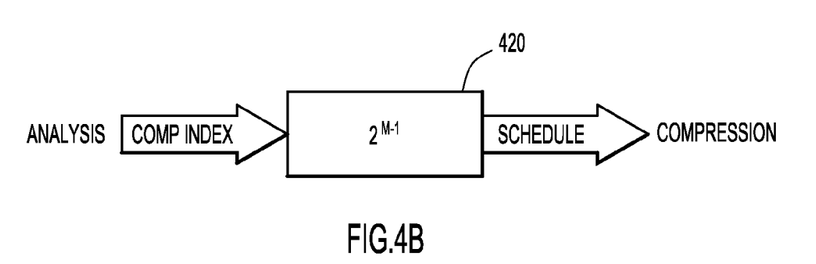

Another example of a compression scheduling scheme is illustrated in FIG. 4B and is referred to herein as exponential selection. Under this scheme, a compression index is provided to pattern generator 420, where the compression index is a number M generated by compression analyzer 345. Pattern generator 420 produces a compression schedule in the form of a bit pattern such that every $2^{M-1}$-th packet is excluded from compression, i.e., skipped, for M≥1. It is to be noted that exponential selection scheduling, or any other scheduling strategy described herein, may executed on-the-fly. That is, a new compression schedule may be applied upon some criterion being met, such as a failure to compress at the current compression schedule. Thus, the compression index M may be incremented upon each compression failure and may be reset upon a following compression success. Other numerical scheduling techniques are also practicable. For example, exponential selection can be implemented as follows. If compression on a packet fails, then the next b packets are skipped, and compression on packet b+1 is attempted. If that attempt fails, then f(b) packets are skipped, and compression on packet f(b)+1 is attempted, and so on. Here f(b) may be a conveniently implementable function, such as f(b)=2b, but need not be exactly linear.

Compression analyzer 345 may receive feedback information from compression engine 350, such as by an indication of the success or failure of the most recent compression attempt. For example, compression engine 350 may be configured to compress packets at a compression level selected from zero (0) to, for example, nine (9), where level 0 compels no compression, level 1 compels fastest compression, level 9 compels best compression, and levels between one (1) and nine (9) are correspondingly scaled from fastest to best compression. Fastest compression is that where less time is spent, and fewer computational resources are used searching for a compact representation of the data, and best compression searches for a most compact representation of the data with only reasonable bounds on the time spent searching therefor, which thus requires greater computational resources. If compression engine 350 attempts to compress a packet of a flow at level, for example, five (5), the success or failure of the attempt may be provided to compression analyzer 345. Compression analyzer 345, in turn, may include consideration of the compression result in the analysis of the node conditions. Accordingly, compression analyzer 345 may reduce the compression level to, for example, four (4) so that future compression attempts will be successful. Certain implementations may increase the compression level if a compression attempt is successful. That is, if the level 5 compression discussed above is successful, an indication of such may be provided to compression analyzer 345, which, responsive thereto, may increase the compression level to, for example, six (6) and may continue such increase until some criterion is met, such as an unsuccessful compression attempt, maximum compression level is reached, etc.

Figure 4C:
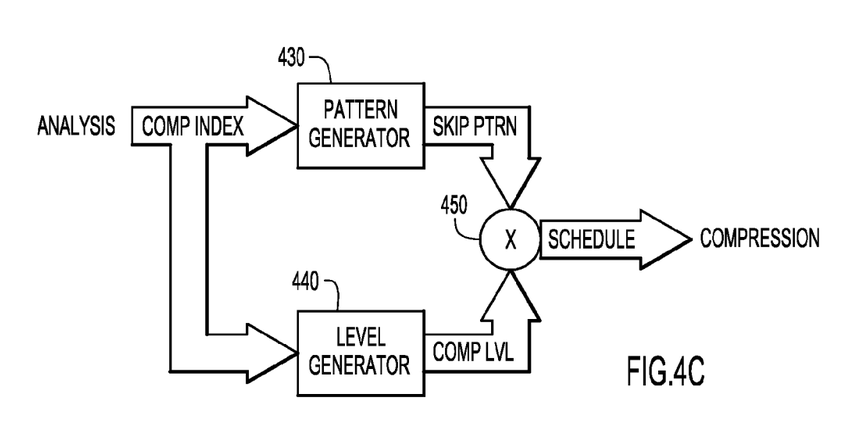

Compression schedules may include information pertaining to a compression level at which to compress portions of a flow. FIG. 4C illustrates a technique of how such a compression schedule may be realized. Compression analyzer 345, in response to analyzing the node conditions, may provide a compression index to compression scheduler 348. The compression index may be a vector of values indicating a skip level and a compression level. Pattern generator 430 may generate a sequence of binary digits, such as discussed above with reference to FIGS. 4A-4B, and level generator may generate a compression level suitable to the given node conditions. At multiplier 450, the skip pattern generated by pattern generator 430 may be multiplied by the compression level generated by level generator 440 to produce a signal by which compression engine 350 excludes certain packets from compression and compresses remaining packets in the flow at the indicated compression level.

Returning to FIG. 3B, compression analyzer 345 includes functional components suitable to determine the node conditions, such as a traffic analyzer 342, a compression state analyzer 344 and node resource analyzer 346, to determine the node conditions and to provide an indication of such to compression scheduler 348. Traffic analyzer 342, compression state analyzer 344 and node resource analyzer 346 may be implemented through suitably programmed processing instructions executing on a processor, such as processor 310.

Traffic analyzer 342 may determine the composition of each flow passing through network node 335. Due to the manner in which data flows are constructed, a typical flow will contain bursts of data packets containing data of the same data type. A flow containing web page data, for example, may include bursts of packets containing image data, which are essentially incompressible beyond the compression level in which they arrive at network node 335, and bursts of packets containing Hypertext Markup Language (HTML) data, which are highly compressible, as are most textual data. Traffic analyzer 342 may determine the type of data currently arriving at network node 335 and may provide an indication of such to compression state analyzer 344 as a node condition.

Node resource analyzer 346 may determine the level at which shared resources are utilized at network node 335, which may be the processing load on processor 310. The resources utilized at network node 335 include those used by compression engine 350, by encryption engine 360 and by other processes 365 currently executing on processor 310, including the resources consumed by FCM 340 itself. The utilization of compression engine 350 may be controlled by FCM 340 and, as such, a compression schedule may be selected by compression analyzer 345 that takes into consideration the resources required for compression. Node resource analyzer 346 may employ suitable resource analysis techniques to determine the resources utilized at node 335, such as the computational load on processor 310, and may provide an indication of such to compression state analyzer 344 as a node condition.

Compression state analyzer 344 may receive information regarding the node conditions, such as the result of the latest compression attempt from compression engine 350, the type of data currently arriving at network node 335 from traffic analyzer 342 and the resource utilization from node resource analyzer 346, to determine a compression index that will compel compression scheduler 348 to generate a compression schedule suitable to the node conditions. Compression state analyzer 344 may have stored in a storage device, such as in storage unit 330, a set of node conditions associated with respective compression strategies and may generate a compression index so that certain packets in a flow are excluded from compression, certain packets the flow are compressed to a compression level, certain packets in the flow are compressed to another compression level, and so on. Other strategies may include: excluding from compression data packets that are less than X bytes in length; excluding from compression the first N packets on a flow, which may be a flow 5-tuple, i.e., source-IP, source-port, destination-IP, destination-port, protocol; excluding remaining packets in a flow upon a positive determination the compression ratio of incoming packets drops to less than Z; noting any expansion of a packet expands during compression and if after N packets, the number of errors exceeds the number of successes, excluding from compression the remaining packets in the flow; increasing the compression level in the compression index when node resource utilization is less Y %; decreasing the compression level in the compression index when node resource utilization is greater than Y %; resetting the number of packets excluded from compression to zero (0) upon a number successful attempts at compression at a given compression level; and excluding entire flows of types that are known to be incompressible, such as traffic of Secured Shell (SSH, port 22) and Secured Hypertext Transfer Protocol (HTTPS, port 443) types. Other node conditions and associated compression strategies are also practicable.

Flow control management may be applied across all flows traversing a particular network node and the available resources of network node 335 may be utilized for compression of the different flows. As previously discussed, processor 310 can be considered as a resource shared across all flows, and the scheduling techniques disclosed above can be supplemented to indicate which flow should next be processed. To that end, general purpose scheduling algorithms, such as weighted fair queuing, a round-robin algorithm or a priority queue can be incorporated into compression scheduler 348 to indicate which flows will be serviced by the processor. The amount of data not transmitted, i.e., the savings in transmitted data by way of compression, per unit time of processor utilization may be indicative of the efficacy of the compression strategy on each flow. Each flow may have associated therewith data that is accessible to compression scheduler 348, which tracks such efficacy and also represents the priority that is to be given to compressing the corresponding flow. For example, since client devices using wireless networks use compression more than those using only wired network connections, flows that traverse wireless networks may be given a higher priority than those traversing wired networks. One implementation may establish a processor-utilization target, for example, 50% of CPU time and may apply higher compression schedules in decreasing priority order while the utilization is below that target.

Figure 5:
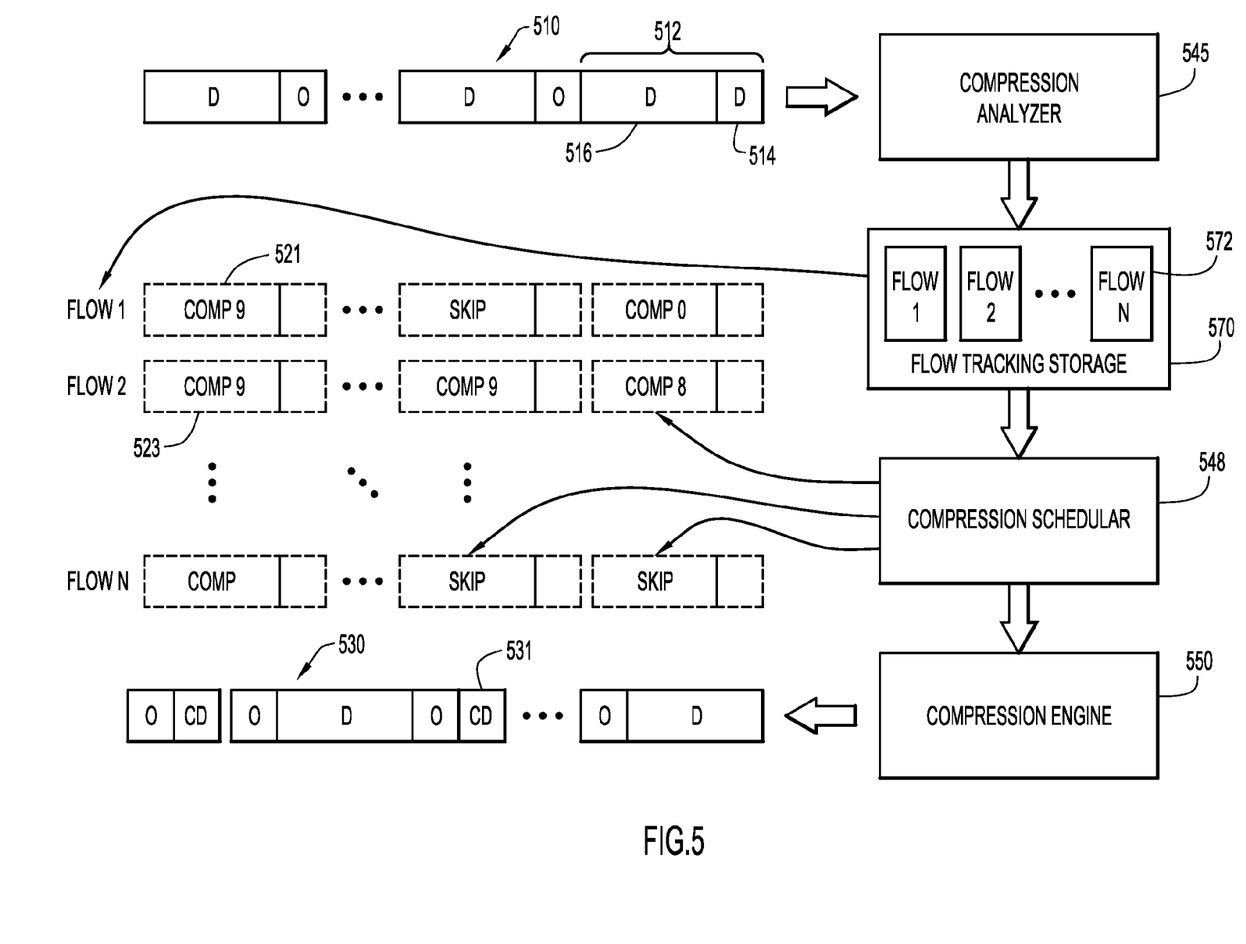
FIG. 5 is a block diagram illustrating flow compression management across multiple flows.

Per-flow compression management is exemplified in FIG. 5. A stream 510 of packets 512 arrive at a network node, such as network node 335. Each packet 512 may comprise packet overhead 514, such as packet headers, and a data payload 516. Compression analyzer 545, in addition to the compression analysis and node condition analysis described above, may determine from data in the packet overhead 514 the flow to which the corresponding packet 512 belongs. Flow tracking storage 570, may be established in, for example, data storage 370, to include a data structure 572 for each flow traversing network node 335. Data structure 572 may include variables associated with the flow, such as the efficacy of the last compression attempt, previous and current compression schedules, and other variables as needed by the implementation to track compression utilization on each flow, representatively illustrated at flows 521, 523, traversing network node 335. Compression scheduler 548 may access data structure 572 for each flow 521, 523 and may select the compression schedule accordingly in a manner similar to those described above. For example, flow 521 may be scheduled to compress at level 0, then to skip a packet, and, so on and then compress at level 9. Flow 523 may be scheduled to compress at level 8, and then at level 9 and compression may continue at level 9 until a compression failure. The compression schedule for each flow may be provided to compression engine 550 and the flows 521, 523 may be multiplexed into an emerging data stream 530 that includes compressed data 531.

Figure 6:
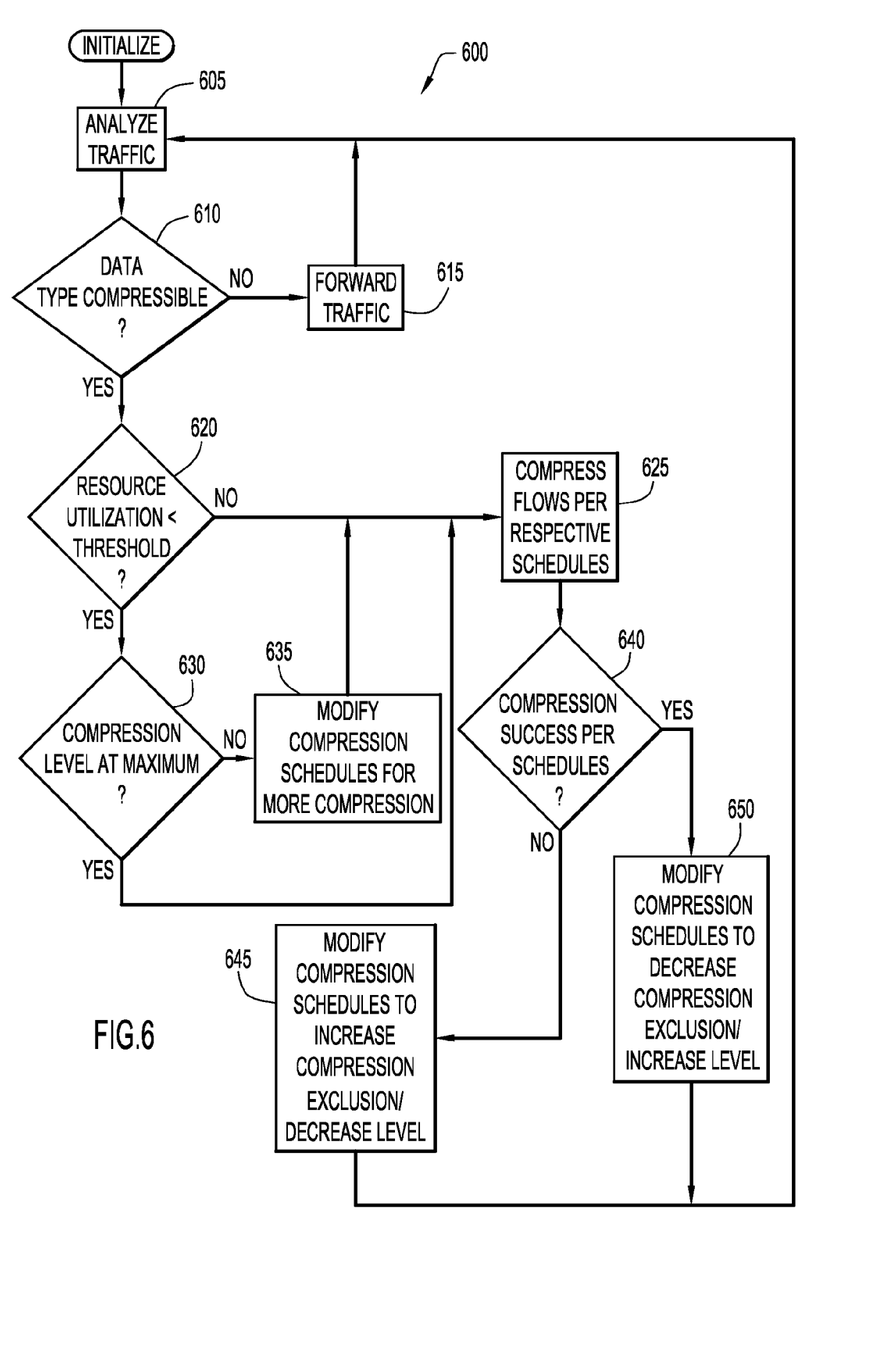
FIG. 6 is a flow diagram of a flow compression management process.

An example of a flow compression management process 600 is illustrated in FIG. 6. It is to be understood that the order in which the operations of process 600 are illustrated and described are solely for purposes of explanation. Other operational orders, including processes that combine operations and those executed in parallel are also practicable.

In operation 605, traffic is analyzed for content, compression level, etc., to determine whether the data in the flows thereof are compressible, as illustrated at operation 610. If the data are not compressible, the flow is scheduled to forward packets therein, as illustrated at operation 615, until compressible data is encountered further into the flow. If the flow data are compressible, the node resource utilization is evaluated at operation 620 to determine whether such utilization is below a threshold. If so, it is determined in operation 630 whether flows are scheduled at the maximum compression level. If the maximum compression level is not in force, the compression schedule is modified to increase the compression level, which may be in a priority order, in operation 635 and the flows are compressed at the corresponding levels in operation 625. If, on the other hand, the compression level is at the maximum, as determined in operation 630, the flows are compressed in accordance with the corresponding compression schedules in operation 625. The result of the compression is determined in operation 640 and if the compression was successful, the compression schedules are modified in operation 650 to decrease the number of packets in the flows that are to be excluded from compression and/or to increase the compression level, and process 600 repeats at operation 605. If, on the other hand, compression was unsuccessful, as determined in operation 640, the compression schedules are modified in operation 645 to increase the number of packets in the flows that are to be excluded from compression and/or to decrease the compression level. Process 600 is repeated at the traffic analysis operation 605.

Storage 333 may comprise read only memory (ROM), random access memory (RAM), magnetic disk storage media devices, optical storage media devices, flash memory devices, electrical, optical, or other physical/tangible memory storage devices. The processor 310 is, for example, a microprocessor or microcontroller that executes instructions for the flow compression management logic. Thus, in general, the memory 333 may comprise one or more tangible computer readable storage media (e.g., a memory device) encoded with software comprising computer executable instructions and when the software is executed (by the processor 310) it is operable to perform the operations described herein in connection with compression analyzer logic 345, compression scheduler logic 348, compression engine logic 165 and, optionally, encryption logic 180.

The above description is intended by way of example only.

What is claimed is:

1. A method comprising:
establishing a compression level for each of a plurality of data flows in a network node;
evaluating computational resources of the network node, a quantity of data passing through the network node, and a type of data passing through the network node to identify the node conditions for the network node;
selecting, based on the established compression levels and the identified node conditions for the network node, a compression schedule for each of the data flows estimated to enable compression of the data flows to the established compression levels given the identified node conditions;
obtaining feedback information indicating that a first data flow is incompressible by the network node to the compression level or is not at a maximum compression when performing compression of the first data flow using the compression schedule selected for the first data flow;
generating a modified compression schedule for the first data flow that is estimated to enable compression of the first data flow to the established compression level or a maximum compression level given the identified node conditions and feedback information; and
compressing the first data flow in accordance with the modified compression schedule.

2. The method of claim 1, wherein establishing the compression level for each of the plurality of data flows includes:
establishing the compression level as a portion of the data flows that is compressed by the network node and a portion of the data flows that is excluded from compression.

3. The method of claim 2, wherein generating a modified compression schedule includes:
establishing a tracking value for each data flow in the plurality of data flows;
incrementing the tracking value in accordance with a number of data packets in the data flows that are determined to be incompressible by the network node; and
excluding, as the portion of the data flow to exclude from the compression, a number of data packets from respective data flows, the number of excluded data packets being specified by the tracking value for the corresponding data flow.

4. The method of claim 3, wherein excluding the portion includes:
establishing a table in which skip patterns are entries, each skip pattern in the table defining which data packets in the data flows to exclude from the compression;
determining a table index value from the tracking value of each of the data flows; and
retrieving from the skip table the skip pattern associated with the table index and excluding the data packets of the corresponding data flow from compression accordingly.

5. The method of claim 4, wherein establishing the table includes:
establishing the skip patterns in the table to exclude an increasing number of the excluded data packets with an increasing table index;
establishing a bit pattern for each of the skip patterns such that a state of a bit therein indicates the data packet to exclude from the compression and a complementary state of the bit indicates a data packet to compress; and
distributing evenly over the bit pattern bits in the state and bits in the complementary state.

6. The method of claim 3, wherein excluding the portion includes:
determining the number of the data packets to exclude from the compression from a geometrically progressive value incremented in accordance with the tracking value.

7. The method of claim 6, wherein determining the number of data packets to exclude includes:
determining the geometrically progressive value through evaluation of an exponential with a fixed base and exponent equivalent to the tracking value.

8. The method of claim 1, wherein the compression schedules define the number of packets in a data flow to compress.

9. The method of claim 8, wherein the compression schedules define the type of data packets to compress or exclude from compression.

10. The method of claim 9, wherein the compression schedules define relative flow compression priorities to minimize impact of compression on the available resources of the network node.

11. An apparatus comprising:
a network interface to enable communications over a network;
at least one memory;
a processor communicatively coupled to the network interface and configured to:
establish compression level for each of a plurality of data flows received at the network interface;
evaluate computational resources of the apparatus, a quantity of data passing through the network interface, and a type of data passing through the network interface to identify node conditions for the apparatus;
select, based on the established compression levels and the identified node conditions for the apparatus, a compression schedule for each of the data flows estimated to enable compression of the data flows to the established compression levels given the identified node conditions;
obtain feedback information indicating that a first data flow is incompressible by the apparatus to the compression level or is not at a maximum compression when performing compression of the first data flow using the compression schedule selected for the first data flow;
generate a modified compression schedule for the first data flow that is estimated to enable compression of the first data flow to the established compression level or a maximum compression level given the identified node conditions and feedback information; and
compress the first data flow in accordance with the modified compression schedule.

12. The apparatus of claim 11, wherein the processor establishes the compression level for each of the plurality of data flows as a portion of the data flows that is compressed and a portion of the data flows that is excluded from compression.

13. The apparatus of claim 12, further comprising a memory and wherein to generate a modified compression schedule the processor is further configured to:
evaluate data packets in the data flows for compressibility; and
increment a tracking value stored in memory for each data flow in the plurality data flows in accordance with a number of data packets in the data flows that are determined to be incompressible; and
exclude, as the portion of the data flows, a number of data packets therein, the number of excluded data packets being specified by the tracking value for the corresponding data flow.

14. The apparatus of claim 13, wherein:
the memory has stored therein a table in which skip patterns are stored as entries, each skip pattern in the table defining which data packets in the data flows to exclude from the compression; and
the processor is configured to determine a table index value from the tracking value of each of the data flows and retrieves from the skip table the skip pattern associated with the table index.

15. The apparatus of claim 14, wherein the skip patterns are stored in the table so as to exclude an increasing number of the excluded data packets with an increasing table index and each of the skip patterns comprises a bit pattern such that a state of a bit therein indicates the data packet to exclude from the compression and a complementary state of the bit indicates a data packet to compress, the bit pattern bits in the state and bits in the complementary state being evenly distributed over the bit pattern.

16. The apparatus of claim 12, wherein the processor is configured to exclude the number of the data packets from a geometrically progressive value incremented in accordance with the tracking value.

17. The apparatus of claim 11, wherein the compression schedules define the number of packets in a data flow to compress.

18. The apparatus of claim 17, wherein the compression schedules define the type of data packets to compress or exclude from compression.

19. The apparatus of claim 18, wherein the compression schedules define relative flow compression priorities to minimize impact of compression on the available resources of the apparatus.

20. A non-transitory computer readable medium having instruction encoded thereon that, when executed by a processor, are operable to cause the processor to:
establish a compression level for each of a plurality of data flows in a network node;
select, based on the established compression levels and identified node conditions for the network node, a compression schedule for each of the data flows estimated to enable compression of the data flows to the established compression levels given the identified node conditions, wherein the compression schedules define the number of packets in a data flow to compress, the type of data packets to compress or exclude from compression, and relative flow compression priorities to minimize impact of compression on the available resources of the network node;
obtain feedback information indicating that a first data flow is incompressible by the network node to the compression level or is not at a maximum compression when performing compression of the first data flow using the compression schedule selected for the first data flow;
generate a modified compression schedule for the first data flow that is estimated to enable compression of the first data flow to the established compression level or a maximum compression level given the identified node conditions and feedback information; and
compress the first data flow in accordance with the modified compression schedule.

21. The non-transitory computer readable medium of claim 20, wherein instructions that are operable to establish the compression level for each of the plurality of data include instructions operable to:
establish the compression level as a portion of the data flows that is compressed by the network node and a portion of the data flows that is excluded from compression.

22. The non-transitory computer readable medium of claim 21, wherein instructions that are operable to generate a modified compression schedule include instructions operable to:
establish a tracking value for each data flow in the plurality of data flows;
increment the tracking value in accordance with a number of data packets in the data flows that are determined to be incompressible by the network node; and
exclude, as the portion of the data flow to exclude from the compression, a number of data packets from respective data flows, the number of excluded data packets being specified by the tracking value for the corresponding data flow.

23. The non-transitory computer readable medium of claim 22, wherein the instructions operable to exclude the portion include instructions operable to:
establish a table in which skip patterns are entries, each skip pattern in the table defining which data packets in the data flows to exclude from the compression;
determine a table index value from the tracking value of each of the data flows; and
retrieve from the skip table the skip pattern associated with the table index and exclude the data packets of the corresponding data flow from compression accordingly.

24. The non-transitory computer readable medium of claim 22, wherein the instructions operable to exclude the portion include instructions operable to:
determine the number of the data packets to exclude from the compression from a geometrically progressive value incremented in accordance with the tracking value.

* * * * *